United States Patent [19]
Sheares

[11] Patent Number: 6,100,373
[45] Date of Patent: Aug. 8, 2000

[54] FUNCTIONALIZED DIENE MONOMERS AND POLYMERS CONTAINING FUNCTIONALIZED DIENES AND METHODS FOR THEIR PREPARATION

[75] Inventor: Valerie V. Sheares, Ames, Iowa

[73] Assignee: Iowa State University Research Foundation, Inc., Ames, Iowa

[21] Appl. No.: 09/138,375

[22] Filed: Aug. 24, 1998

[51] Int. Cl.[7] .................................................. C08G 73/00
[52] U.S. Cl. .......................... 528/422; 585/262; 585/422; 585/506
[58] Field of Search ............................ 528/422; 585/262, 585/506, 422

[56] References Cited

U.S. PATENT DOCUMENTS

| | | |
|---|---|---|
| 3,492,277 | 1/1970 | Clark . |
| 3,761,458 | 9/1973 | Holler et al. . |
| 3,796,687 | 3/1974 | Collette et al. . |
| 4,139,417 | 2/1979 | Marie et al. . |
| 4,423,196 | 12/1983 | Arlt et al. . |
| 4,701,507 | 10/1987 | Mate et al. . |
| 4,987,200 | 1/1991 | Datta et al. . |
| 5,153,282 | 10/1992 | Datta et al. . |
| 5,206,300 | 4/1993 | Chamberlain . |
| 5,216,083 | 6/1993 | Grubbs et al. . |
| 5,280,066 | 1/1994 | Tekkanat et al. . |
| 5,310,798 | 5/1994 | Lawson et al. . |
| 5,354,822 | 10/1994 | Antkowiak et al. . |
| 5,405,911 | 4/1995 | Handlin, Jr. et al. . |
| 5,430,095 | 7/1995 | Ishiura et al. . |
| 5,508,333 | 4/1996 | Shimizu . |
| 5,627,248 | 5/1997 | Koster et al. . |
| 5,629,047 | 5/1997 | Sharma et al. . |
| 5,665,812 | 9/1997 | Gorce et al. . |

OTHER PUBLICATIONS

Chem Motrack: 129 : 82012 On the Anionic Polymerization of Dialkylaminoisoprenes.

"Gerd et al." 127 : 26056 Water Developable Photo Sensitive Polymer Composition With Low Water Swelling Capability.

"Katnia et al." 123 : 144735 The Anionic Copolymerization of 5–(N,N–Diisopropylamino) Isoprene with Styrene.

"Cesar et al." 123 : 286898 The Anionic Polymerization of 5–(N,N–Dialkylamino Isoprene.

"Reimund et al" 121 : 58088 On the Anionic Polymerization of (Dialkylamines) Isoprene.

"Casar et al" 118 : 102664 On the Polymerization of Dialkylamines Isoprenes.

Katsuhiko Takenaka et al., "Polymerization of Monomers Containing Functional Silyl Groups 10. Anionic Polymerization of 2–Silyl–Substituted 1,3–Butadienes with Mixed Substituents", Macromolecules 25, Americal Chemical Society, pp. 96–101, 1991.

Cesar Petzhold, "On the Polymerization of Dialkylaminoisoprenes, 1", Madromolecules Chem., Rapid Commun. 14, pp. 33–43, 1993.

Cesar Petzhold et al., "On the Anionic Polymerization of (Dialkylamino)Isoprenes. 1. Influence of the Teritiary Amino Group on the Polymer Microstructure", Macromolecules 1994, 27, pp. 3707–3713.

Akira Hirao et al., "Polymerization of Monomers Containing Functional Silyl Grups. 13. Anionic Polymerization of 2–(N,N–Dialkylamino–Dimethylsil.yl–1,3–Butadiene Derivatives", Macromolecules 1998, 31, pp. 281–287.

*Primary Examiner*—Duc Truong
*Attorney, Agent, or Firm*—Dickstein, Shapiro, Morin & Oshinsky, LLP

[57] ABSTRACT

Functionalized diene monomers and polymerized functionalized diene monomers including 2-cyanomethyl-1,3-butadiene, 2-acetoxymethyl-buta-1,3-diene, dimethyl-(2-methylene-but-3-enyl)-amine, 2-dimethylaminomethyl-1,3-butadiene, 2-di-n-propylaminomethyl-1,3-butadiene, 3-methylene-pent-4-enoic acid, 3-methylene-pent-4-enoic acid ethyl ester, bis-2,3-[N,N-diethylaminomethyl]-1,3-butadiene, ethyl-5,6-dimethylenedecanediote, and cyano-5,6-dimethylenedecanediote. Methods for synthesizing such functionalized diene monomers and polymers are also provided.

26 Claims, No Drawings

FUNCTIONALIZED DIENE MONOMERS AND POLYMERS CONTAINING FUNCTIONALIZED DIENES AND METHODS FOR THEIR PREPARATION

FIELD OF THE INVENTION

This invention relates to functionalized diene monomers, polymers containing functionalized dienes, and methods for preparing functional or polar group-bearing diene monomers and polymers.

BACKGROUND OF THE INVENTION

Interest in the field of functionalized polymeric materials stems from the desire to combine the unique properties of a functional group with those of a high molecular weight polymer.

Functionalized polymers have the potential for crosslinking via ionic interactions and covalent bonds, leading to improved properties for applications such as polymer blends. The introduction of specifically interacting groups is a particularly versatile route to miscibility enhancement. Other applications of these materials are in membranes, packaging, dispersants, adhesives and coatings. In addition, functionalized polymers may be used in the modification of existing materials to alter their adhesion, processability, solubility, dyeability, thermal, mechanical, and other properties.

Functional groups can be introduced into a polymer by two general approaches: (1) chemical modification of a nonfunctionalized, preformed polymer, or (2) polymerization or copolymerization of monomers containing the functionality. The second method has the advantages of producing a more homogeneous polymer with more uniform functionalization, the ability to analyze the monomers prior to polymerization, and the ability to control loading and distribution of functional groups along the polymer backbone.

Various different functional or other polar groups have been incorporated into a number of polyolefin and polyvinyl materials. Successful functionalization is typically performed after polymer formation. In many instances, only terminal functionalization is achieved. Where functionalized monomers have been polymerized to prepare functional group-bearing polymers, the extra steps of masking the monomer functionality prior to polymerization, and then subsequently removing the mask, have been required. Limited success has previously been achieved in the polymerization of functionalized diene monomers, although such monomers have enormous commercial significance and utility in materials such as elastomers, adhesives, molded mechanical articles, and the like.

Initial work with nonsilicon-containing functionalized dienes was reported by Petzhold et al., which focused on anionic polymerization of N,N-diethylaminoisoprene and elucidation of microstructures. Petzhold, C., et al., Makromol. Chem., Rapid Commun., 14, 33–43 (1993), refers to low yields (<50%) of low molecular weight (number-average molecular weight 5000) polymers obtained by anionic and radical polymerization of N,N-diisopropyl-2-vinylallylamine. Petzhold, C., et al. Marcomolecules, 27, 3707–13 (1994), refers to low yields of low molecular weight polymers obtained by anionic polymerization of a series of N,N-dialkyl-2-vinylallylamines.

What is needed are new functionalized diene monomers and methods for preparing and polymerizing functional dienes to produce high yields of functionalized diene polymers, without the requirements of masking and unmasking the functional group, or of adding the functionality only after polymerization.

SUMMARY OF THE INVENTION

The present invention provides functionalized diene monomers and methods for preparing and polymerizing such functional group-bearing monomers to prepare high yields of functionalized polymers and copolymers.

The diene monomers and functionalized polymers of the invention include, but are not limited to, isoprene monomers and polymerized functionalized isoprene monomers such as 2-cyanomethyl-1,3-butadiene, 2-acetoxymethyl-buta-1,3-diene, dimethyl-(2-methylene-but-3-enyl)-amine, 2-dimethylaminomethyl-1,3-butadiene, 2-di-n-propylaminomethyl-1,3-butadiene, 3-methylene-pent-4-enoic acid, and 3-methylene-pent-4-enoic acid ethyl ester, as well as disubstituted functionalized diene monomers and polymerized disubstituted functionalized diene monomers such as bis-2,3-[N,N-diethylaminomethyl]-1,3-butadiene, ethyl-5,6-dimethylenedecanediote, and cyano-5,6-dimethylenedecanediote. Also provided herein are methods for synthesizing these and other functionalized diene monomers, polymers and copolymers.

The resulting polymers and copolymers may be used as is or blended with other materials to make a variety of new products, including adhesives, elastomers, ionomers for, e.g., coatings and membranes, and may also be employed as functionalized polyolefin precursors. The resulting functionalized polymers or polymer blends may be quaternized, hydrogenated, cross-linked, or subject to other known polymer reactions to enhance properties for specific applications, as described in detail herein.

Additional objects and advantages of the invention will be set forth in part in the description which follows, and in part will be obvious from the description, or may be learned by the practice of the invention. The objects and advantages of the invention will be attained by means of the instrumentalities and combinations particularly pointed out in the appended claims.

DETAILED DESCRIPTION OF THE PREFERRED EMBODIMENTS

Reference will now be made in detail to the presently preferred embodiments of the invention, which together with the following examples, serve to explain the principles of the invention.

Functional Diene Monomers

The present invention provides functionalized diene monomers of the formula:

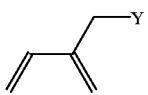

Compound 1: Y=CN
Compound 2: Y=OCOCH$_3$
Compound 3: Y=NR$_2$ (3a: R=methyl; 3b: R=ethyl; 3c: R=isopropyl)
Compound 4: Y=COOH
Compound 5: Y=COOEt and similar functionalized monomers, having various functional groups, which may be synthesized by following the teachings provided herein.

The present invention also provides disubstituted functionalized diene monomers of the formula:

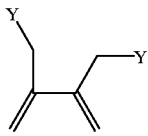

Compound 6: Y=NR$_2$(6a:R=methyl; 6b: R=ethyl; 6c: R=isopropy)

and similar disubstituted functionalized diene monomers, having various functional groups, which may be synthesized by following the teachings provided herein.

The invention further provides disubstituted functionalized diene monomers of the formula:

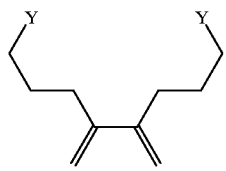

Compound 7: Y=COOEt
Compound 8: Y=CN and similar disubstituted functionalized monomers, having various functional groups, all of which may be synthesized by one of ordinary skill in the art given the teachings provided herein.

Monomer Synthesis and Purification

Compounds 1–8 and similar functionalized diene monomers are preferably synthesized by the techniques discussed below, although any suitable method may be used. The invention, including the polymers and polymerization products and processes of the invention, should be understood as not being limited to the following preferred monomers or monomer syntheses.

Compounds 1, 2 and 3a–c are preferably synthesized by first synthesizing 1,4-dibromo-2-methyl-2-butene, by reacting isoprene with bromine at a temperature in the range of about 20° C. or below.

1,4-dibromo-2-methyl-2-butene may then be reacted at elevated temperature in the range of about 120° C. with 1,3-dimethyl-3,4,5,6-tetrahydro-2(1H-pyrimitinone)). The resulting 2-bromomethyl-1,3-butadiene is then functionalized by reaction with, e.g., sodium cyanide, sodium acetate, dimethylamine, diethylamine or di-n-propylaridne to prepare compounds 1, 2, and 3a–c. Resulting compounds may be purified by acid/base extraction using, for example, 10% sodium hydroxide and 25% hydrochloric acid.

Compound 4 is preferably synthesized by mixing Compound 2 with sodium hydroxide. The mixture may include a solvent and may be acidified to reduce the pH.

Compound 5 is preferably synthesized by mixing Compound 2 with ethanol and concentrated sulfuric acid. The reaction mixture may then be cooled, washed and dried with such as magnesium sulfate. The solvent may then be evaporated.

Compound 6b is preferably synthesized by reacting diethylamine with 2,3-dibromopropene to produce 1-diethylamino-2-bromo-propene. Copper iodide is then added with THF and the mixture is cooled to below about −78° C. The solution is stirred and allowed to gradually rise to room temperature. The mixture may then be opened to air and poured into a solution of saturated ammonium chloride. Compound 6a may then be extracted with, e.g., ether, and dried.

Compounds 6a and 6c are preferably synthesized by the same process as indicated above for Compound 6b, except by using dimethylamine or diisopropylamine, respectively, instead of diethyl amine. Any aminoisoprene monomer may be prepared by this same method with the desired choice of dialkylamine.

Compound 7 is preferably synthesized by mixing ethyl-4-chlorobutyrate with acetone and sodium iodide. 1,2-dibromomethane is then mixed with zinc granuals and THF. Chlorotrimethylsilane is then added to this mixture. Subsequently, the ethyl-4-iodobutyrate mixture is added and the mix is heated to about 50° C. Lithium chloride and copper cyanide are then added. The solution is warmed to about 0° C. and then cooled to about −78° C. or less, and 1,4-dichlorobutyne is added. The reaction is then quenched and the organic layer is extracted, dried and filtered. Varying diester derivatives of Compound 7 may be synthesized in a similar manner by varying the alkyl-4-haloester added to acetone and sodium iodide.

Compound 8 is preferably synthesized in the same manner as indicated above with respect to Compound 7, except that the synthesis starts with 4-chlorobutyronitrile instead of ethyl-4-chlorobutyrate. Again, any cyano monomer can be prepared by varying the 4-halonitrile.

Accordingly, the monomers and polymers according to the present invention are not limited to the preferred compounds, Compounds 1, 2, 3a–c, 4, 5, 6a–c, 7 and 8, but also extend to other aminoisoprenes, diester derivatives, cyano monomers, and other functionalized diene monomers and polymers that can be prepared given the detailed description of the preferred product and process embodiments provided herein.

Polymerization

Polymerizations according to this invention and recovery of polymer are suitably carried out according to various methods suitable for diene monomer polymerization processes. This includes batchwise, semi-batchwise or continuous operations under conditions that exclude air and other atmospheric impurities, particularly moisture. The polymerization of the functionalized monomers of the invention may also be carried out in a number of different polymerization reactor systems, including but not limited to bulk polymerization, solution polymerization, suspension polymerization, emulsion polymerization, and precipitation polymerization systems. The currently preferred methods are solution, bulk and emulsion polymerizations.

The polymerization reaction may use a free radical initiator, although anionic, cationic, and catalytic initiation systems may also be employed. The preferred initiation systems are free radical and anionic, depending upon the particular monomers being polymerized. Precautions need to be taken when performing anionic polymerizations of Compounds 1, 2, 4, 5, 7, and 8. These polymerizations are preferably run at −78° C., using the more bulky initiators. Bulky initiators include, for example, diphenylhexyllithium, lithium naphthalenide and cumyl potassium. An advantage of free radical polymerization is that reactions can typically be carried out under less rigorous conditions than ionic polymerizations. Free radical initiation systems also exhibit a greater tolerance of trace impurities. A consequence of this is that high molecular weight polymers can be produced without removal of the stabilizers that may be added to the monomers, trace amounts of oxygen, or solvents that have not been rigorously dried.

Examples of free radical initiators that are useful in the practice of the present invention are those known as "redox" initiators, such as combinations of chelated iron salts, sodium formaldehyde sulfoxylate, and organic hydroperoxides. Representative of organic hydroperoxides are cumene hydroperoxide, paramenthane hydroperoxide, and tertiary butyl hydroperoxide. Tertiary butyl hydroperoxide (t-BHp) and "azo" initiators, such as azobisisobutyronitrile (AIBN), are preferred.

The reaction temperature is typically maintained in the range of between 0° and 150° C. Temperatures between about 70° and 120° C. are generally preferred. The reaction pressure is not critical. It is typically only sufficiently high to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with an inert gas.

In batch operations, the polymerization time of functionalized diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

The concentration of monomer in the reaction mixture may vary upward from 5 percent by weight of the reaction mixture, depending on the conditions employed; the range from 20 to 80 percent by weight is preferred.

The polymerization reactions according to this invention may be carried out in a suitable solvent which is liquid under the conditions of reaction and relatively inert. The solvent may have the same number of carbon atoms per molecule as the diene reactant or it may be in a different boiling range. Preferred as solvents are alkane and cycloalkane hydrocarbons. Suitable solvents are, for example, propane, butane, isobutane, cyclohexane, methylcyclohexane, or various saturated hydrocarbon mixtures. Aromatic hydrocarbons such as benzene, toluene, isopropylbenzene, xylene, or halogenated aromatic compounds such as chlorobenzene, bromobenzene, or orthodichlorobenzene may also be employed.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate soaps are useful in the instant invention. The level of ionic surfactant is computed based upon the total weight of the organic components and may range from about 2 to 30 parts by weight of ionic surfactant per 100 parts by weight of organic components.

Preferably the polymerization is carried out to complete functionalized diene monomer conversion in order to incorporate essentially all of the polymerizable functional group-bearing monomer. Incremental addition, or a chain transfer agent, may be used in order to avoid excessive gel formation. Such minor modifications are within the skill of the artisan. After the polymerization is complete, the polymer is recovered from a slurry or solution of the polymer. A simple filtration may be adequate to separate polymer from diluent. Other means for separating polymer from diluent may be employed. The polymer may be treated, separately or while slurried in the reaction mixture, in order to separate residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% hydrochloric acid. Following this initial coagulation the polymers may be washed several more times in methanol.

The functionalized diene monomers according to the present invention may also be polymerized with one or more comonomers. Some adjustments in the polymerization recipe or reaction conditions may be necessary to obtain a satisfactory rate of polymer formation, depending on the amount of functionalized monomer included and the other monomers involved. Examples of comonomers that are useful in the practice of this invention are diene monomers such as butadiene, isoprene, piperylene, and hexadienes. One may, in addition to the diene monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer to comonomer (including any additional vinyl monomer). A charge ratio by weight of about 5/95 to about 80/20 is preferred with 10/90 to 40/60 the most preferred. According to one embodiment, the weight ratio of functionalized diene monomer to diene monomer to vinyl monomer may range from 5:75:20 to 95:5:0. Ratios will vary depending on the amount of chemical functionality desired to be incorporated and on the reactivity ratios of the monomers in the particular polymerization system used.

Polymers

The polymers containing polar compounds, produced according to this invention, are generally produced as substantially linear polymers having, in general, a weight average molecular weight in the range from about 10,000 to a million. The polymer structures from each of the representative monomers, Compounds 1–8, are shown below.

Compound 1: 2-cyanomethyl-1,3-butadiene polymerizes to poly(cyanoisoprene). The various microstructures include:

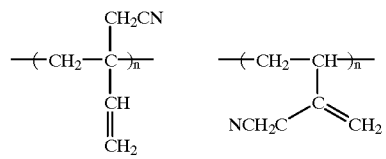

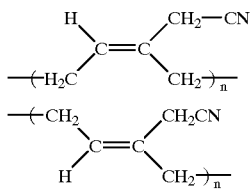

Compound 2: 2-acetoxymethyl-buta-1,3-diene polymerizes to poly(2-acetoxymethylbutadiene). The various microstructures include:

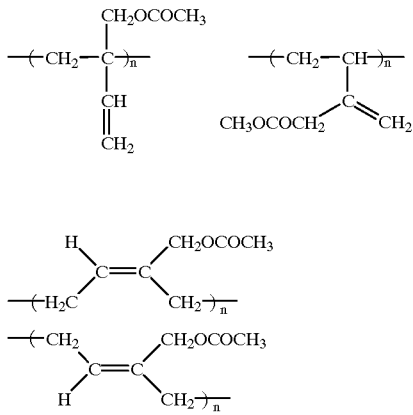

Compounds 3a, 3b, and 3c polymerize to poly(N,N-dimethylaminoisoprene), poly(N,N-diethyl-aminoisoprene), and poly(N,N-di-n-propylaminoisoprene), respectively. In the case of Compounds 3, we have typically found more cis-1,4 microstructure than trans-1,4, and very little 1,2 and 4,3 structures.

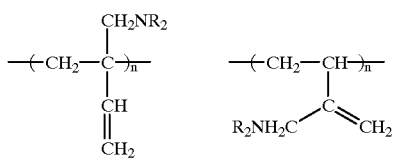

for 3a, R=CH$_3$
for 3b, R=CH$_2$CH$_3$
for 3c, R=CH$_2$CH$_2$CH$_3$

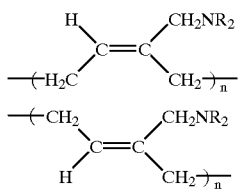

Compound 4 polymerizes to poly(2-carboxymethylisoprene):

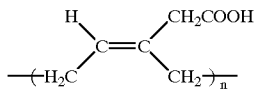

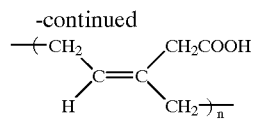

Compound 5: 3-methylene-pent-4-enoic acid ethyl ester polymerizes to poly(2-ethylethanoatebutadiene):

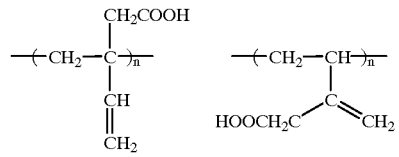

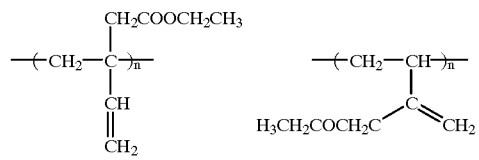

Compounds 6a, 6b, and 6c polymerize to poly[2,3-(N,N-dimethylaminomethyl)-butadiene], poly[2,3-(N,N-diethylaminomethyl)-butadiene], and poly[2,3-(N,N-diisopropylaminomethyl)-butadiene], respectively. For these monomers (which are symmetrical) there are only three possible microstructures:

for 6a, R=CH$_3$
for 6b, R=CH$_2$CH$_3$
for 6c, R=CH(CH$_3$)$_2$

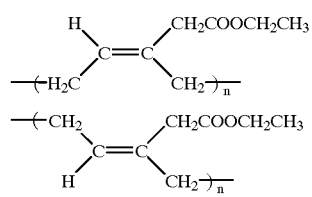

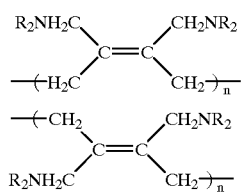

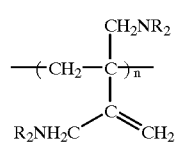

4,3=1,2 in the case of symmetrical monomers.
Compound 7 polymerizes to poly[2,3-(ethylbutanoate) butadiene]. Again, only three structures are possible:

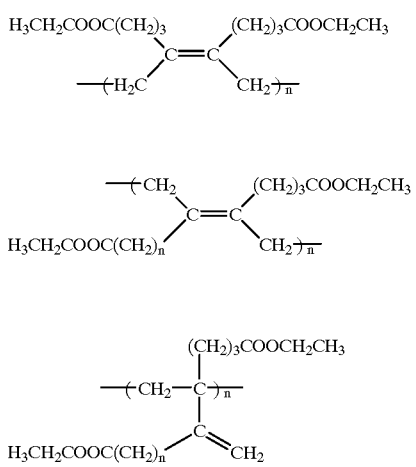

Poly[2,3-(cyanomethyl)butadiene] is made from Compound 8. The three possible structures are:

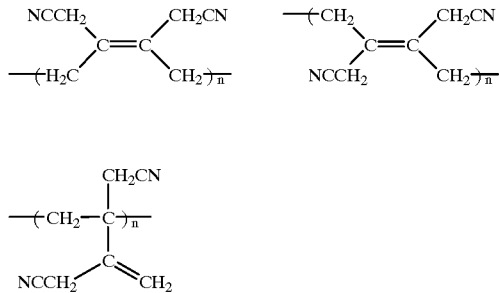

Polymer Properties

The homopolymers and copolymers produced according to this invention vary widely in physical and chemical properties, depending on the polar groups employed, the ratio of polar compound to hydrocarbon compound in the product, and the stereochemistry and relative arrangement of polar compound and hydrocarbon units in the polymer chains.

Following crosslinking (thermally or chemically) many of the functionalized polymers of the present invention are elastomeric. When the Tg of the original polymer is below room temperature, the final crosslinked polymer is typically elastomeric. The low glass transition temperatures (Tg) of many of the resulting functionalized polymers herein make these polymers particularly good precursors for elastomers. After crosslinking, i.e., further reaction of the remaining double bonds in the functionalized diene polymer to connect some or all of these bonds between polymer chains, the final material is insoluble in common organic solvents (chloroform, tetrahydrofuren, methylene chloride, acetone, benzene, etc.). This may be accomplished by irradiation with UV light or by vulcanization (addition of sulfur and heating).

Thermoplastic elastomers, actually copolymers of a material with a Tg above room temperature and a polymer with a Tg above room temperature, may also be conveniently formed. For example:

polystyrene-polycyanoisoprene-polystyrene

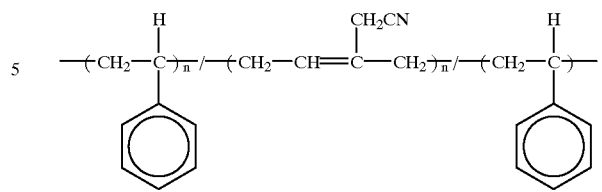

Tg=100° C. Tg<25° C. Tg=100° C.

The higher Tg chain ends serve as the "crosslinkers" and give elastomeric materials. Commercial materials, e.g., spandex, fall into this category.

The polymerized aminoisoprenes can also be quaternized, if desired, to the salt form (ionic form).

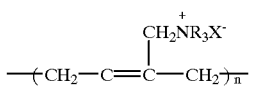

These materials are useful in various applications such as coatings and membranes. This may be achieved by standard addition of a reagent ($CH_3I$, HCl, etc.) to change the tertiary group to a quaternary group. The nitrogen, for example, will then have four groups attached and a positive charge. This is a salt form that may be completely or partially $H_2O$ soluble. Furthermore, if the groups are quaternized about 10–20%, useful ionomers will result. Compounds 3a, 3b, and 3c can be quaternized to produce functionalized ionomers for miscibility enhancement in poly blends and various other applications.

Other applications include functionalized polyolefin precursors (after hydrogenation of polymers). In the preferred functionalized polymers, the final materials typically contain C=C bonds. Once hydrogenated, these will become C—C bonds and thus the final polymers will be polyolefins. The invention therefore provides functionalized polyolefins in one step. The monomers can also be covalently bound modifiers to existing materials.

Adhesive properties also originate from the polymeric functional groups. The aminoisoprenes are quite adhesive, unlike the nonfunctionalized material, polyisoprene. The polymers of this invention are therefore particularly useful in surface coatings and adhesives since the presence of polar groups causes excellent adherence of the coatings to various substrates, such as metals, glasses, and plastics.

The resulting functionalized diene polymers and copolymers are also suitable for the production of numerous molded or extruded manufactured articles such as containers, packaging films, textile fibers, and the like, and for use as rubbers, such as in tires. The incorporation of polar dienes into rubbery hydrocarbon copolymers according to this invention also provides a novel and improved method of functionalization and derivatization.

The physical properties of polymers produced according to this invention vary, depending on the polar compound employed, the proportion thereof in the total polymer, and the method of preparation of the polymer, i.e., whether it is prepared by homopolymerization, random copolymerization or block copolymerization. The polymers may be oily liquids, glassy solids, rubbery solids or highly crystalline polymers.

It is to be understood that the application of the teachings of the present invention to a specific problem or environment will be within the capabilities of one having ordinary skill in the art in light of the teachings contained herein. Examples of the compounds and compositions of the present invention and methods of their preparation and use appear in the following examples.

EXAMPLE 1

The object of this Example is to show a preferred synthesis of functionalized isoprene monomers of the formula:

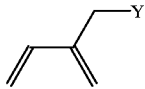

Compound 1: Y=CN, 2-cyanomethyl-1,3-butadiene
Compound 2: Y=OCOCH$_3$,2-acetoxymethyl-buta-1,3-diene
Compound 3:
  3a: Y=NMe$_2$,dimethyl-(2-methylene-but-3-enyl)-amine
  3b: Y=NEt$_2$,2-dimethylaminomethyl-1,3-butadiene
  3c: Y=N(n-propyl)$_2$,2-di-n-propylaminomethyl-1,3-butadiene
Compound 4: Y=COOH,3-methylene-pent-4-enoic acid
Compound 5: Y=COOEt,3-methylene-pent-4-enoic acid ethyl ester Synthesis of Compound 1, 2 and 3a–c Step 1: synthesis of 1,4-dibromo-2-methyl-2-butene

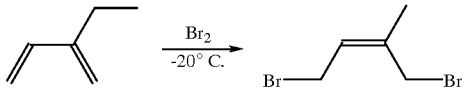

Isoprene (68.12 g, 1 mol) was added to a 2 or 3 neck round bottom flask cooled with a dry ice/acetone bath and stirred. Using an addition funnel, bromine was added (159.82 g, 1 mol) dropwise at a rate necessary to keep the temperature at −20° C. or below. Monitor temperature from inside. When bromine addition was complete, the flask was purged with nitrogen, covered with foil and stored in refrigerator until the next step. The yield of this step was almost 100%. Product is light yellow liquid. The boiling point is 78–80° C./10 Torr. The molecular weight is 228 g/mol. The structure was verified by 1HNMR (300 MHz, CDCl3): 5.91 (t, 1H), 3.96 (m, 4H), 1.88 (s, 3H).

Step 2: synthesis of 2-bromomethyl-1, 3-butadiene

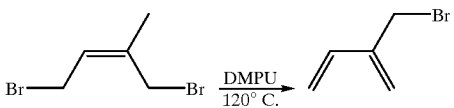

Using 2:1 v/v DMPU (1,3-dimethyl-3,4,5,6-tetrahydro-2 (1H)-pyrimidinone):dibromide, both reagents (200 ml DMPU and 1 mol dibromide) were added to a round bottom flask. The solution was stirred and heated until temperature reached 120° C. A water aspirator equipped with cold trap was used to pull vacuum. When the internal temperature reached 120° C., vacuum pulled and the monobromide was collected in a round bottom flask. The flask was then purged with nitrogen, covered with foil and stored in a refrigerator until the next step. The yield of this step was approximately 50%. The product is light yellow liquid. The molecular weight is 147 g/mol and boiling point is 68° C./80 Torr. The structure was verified by 1HNMR and GC-Mass. 1HNMR (300 NHz, CDCl3): 4.12 (s, 2H), 6.47 (dd, 1H), 6.1–6.4 (2s, 2d, 4H).

Step 3: synthesis of compound 1, 2, or 3

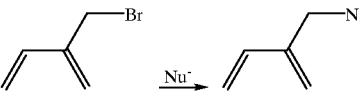

Compound 1: Nu=CN
Compound 2: Nu=OCOCH3
Compound 3: Nu=NR2 (3a: R=methyl, 3b: R=ethyl, 3c: R=n-propyl)

Monobromide (73.5 g, 0.5 mol) made in step 2 and the desired neucleophile (73.3 g sodium cyanide or 41.0 g sodium acetate or 22 g dimethylamine or 36 g diethylamine or 50 g di-n-propylamine) and solvent (1: 500 mL acetonitrile, 2: 500 mL acetic acid, 3a–3c: no solvent) were added to a round bottom flask. The mixture was stirred at room temperature for 24 hours. To work up, the mixture was then quenched with water, and the product was extracted with ether, washed with 10% sodium thiosulfate solution two or three times (for 2 and 3a–c, this wash step is not necessary), water and saturated sodium chloride solution. Compounds 3a–3c were purified by using an acid/base extraction: 10% NaOH was added to the functionalized amine until pH=11. The mixture was then stirred for two hours. A separatory funnel was used to collect the organic layer. The aqueous layer was then rinsed with ether and the organic layer was combined with the previous organic layer. The organic phase was then washed with a 25% HCl solution at pH=2 for two hours. A separatory funnel was then used to collect the aqueous layer. Ether was added to the aqueous phase and also 10% NaOH until pH=11. A separatory funnel was again used to collect the organic layer. Magnesium sulfate powder was then added to the organic solution, which was next filtered, and placed in a rotary evaporator to remove the solvent. The compound 1 is clear liquid. The molecular weight is 93 g/mol and the structure was verified by 1HNMR and GC-Mass. 1HNMR (300 NHz, CDCl3): 6.47 (dd, 1H), 5.48 (s, 1H), 5.33 (s, 1H), 5.23 (d, 1H), 5.20 (d, 1H). The molecular weight of compound 2 is 126 g/mol. The molecular weight of compound 3a is 111 g/mol and the structure was verified by 1HNMR 1HNMR (300 NHz, CDCl3): 6.37 (dd, 1H), 5.41 (d, 1H), 5.0–5.2 (1d, 2s, 3H), 2.21 (s, 6H), 3.01 (s, 2H). The molecular weight of compound 3b is 139 g/mol and the structure was verified by 1HNMR. 1HNMR (300 NHz, CDCl3): 6.38 (dd, 1H), 5.42 (d, 1H), 5.19 (s, 1H), 5.13 (s, 1H), 5.07 (d, 1H), 2.50 (q, 4H), 1.01 (t, 6H), 3.15 (s, 2H). The molecular weight of compound 3c is 167 g/mol and the structure was verified by 1HNMR. 1HNMR (300 NHz, CDCl3): 6.38 (dd, 1H), 5.43 (d, 1H), 5.05 (d, 1H), 5.21 (s, 1H), 5.11 (s, 1H), 0.84 (t, 6H), 1.44 (h, 4H), 2.34 (t, 4H), 3.13 (s, 2H).

Synthesis of Compounds 4 and 5

Step 4: synthesis of Compounds 4 and 5

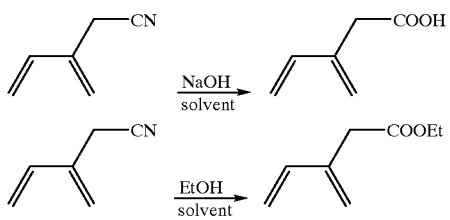

For Compound 4: A stirred mixture of Compound 2 (9.3 g, 0.1 mol) made in step 3 and sodium hydroxide (4 g, 0.1 mol) in solvent was refluxed for 24 hours. The cooled mixture and water were then acidified to reduce the pH. The molecular weight of Compound 4 is 112 g/mol.

For Compound 5: A stirred mixture of Compound 2 (9.3 g, 0.1 mol) made in step 3, ethanol (4.6 g, 0.1 mol), and concentrated $H_2SO_4$ (catalytic amount, 0.1 g, 1 mmol) was refluxed for 24 hours. The workup consisted of adding 15 mL methylene chloride and 15 mL water to the cooled reaction mixture, and separating the layers. The organic layer was washed with water, a 5% aqueous $NaHCO_3$ solution, and a saturated sodium chloride solution and dried with magnesium sulfate. The solvent was then evaporated. The molecular weight of Compound 5 is 140 g/mol.

EXAMPLE 2

The object of this example is to show a preferred synthesis of disubstituted functionalized diene monomers of the formula:

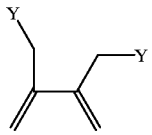

Compound 6: $Y=NR_2$(6a: R=methyl; 6b: R=ethyl; 6c: R=isopropy)

Synthesis of Compound 6b, Bis-2,3-[N,N-Diethylaminomethyl]-1,3-butadiene: To a 3-neck 2.0 L flask was added 260 mL (2.5 mol) of diethyl amine and 400 mL of ether. This was then cooled with an ice and saturated sodium chloride solution bath. To a pre-chilled dropping funnel was added 200 mL of ether and 100 g (0.5 mol) of 2,3-dibromopropene. This solution was then slowly added dropwise and the resulting mixture was stirred overnight. This solution was filtered and then was extracted twice with ether. The organic phase was then dried over magnesium sulfate and then concentrated to give 89 g (93%) of the crude yellow oil 1-Diethyl amino-2-bromo-propene. 1H NMR (300 MHz, CDCl3) 1.1 (t, 6H), 2.57 (q, 4H), 3.25 (s, 2H), 5.53 (d, 1H), 5.9 (d, 1H).

To an argon purged 100 mL schlenk flask was added 10 g (52 mmol) of 1-Diethyl amino-2-bromo-propene and 20 mL of THF (tetrahydrofuran). This was then cooled to below −78° C. and then 23 mL of 2.5M butyllithium was added. This solution was allowed to stir for a half-hour.

To another argon purged flask 5 g (26 mmol) of Copper Iodide was added and then dissolved in 20 mL of THF. This was also cooled to below −78° C. The solution prepared above was then transferred into the copper solution and allowed to stir overnight allowing the temperature to gradually increase to room temperature. The reaction mixture was then opened to air and poured into a solution of saturated ammonium chloride. This was twice extracted with 75 mL of ether and then the organic portion was dried over magnesium sulfate in a 500 mL erlenmeyer flask, filtered and concentrated in a vacuum to give a non-viscous yellow oil. 1H NMR (300 MHz, CDCl3) 1.00 (t, 12H), 2.45 (q, 8H), 2.92 (s, 4H), 4.81 (d, 2H), 4.91 (d, 2H). The Compounds 6a and 6c are made the same way except using dimethyl amine or diisopropyl amine respectively.

EXAMPLE 3

The object of this Example is to show a preferred synthesis of disubstituted functionalized diene monomers of the formula:

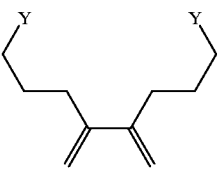

Compound 7: Y=COOEt
Compound 8: Y=CN

Synthesis of Compound 7, Ethyl-5,6-dimethylenedecacloate: To a 1.0 L round bottom flask equipped with a water condenser was added 700 mL of acetone and 90 g (600 mmol) of sodium iodide. Then 14 ml (100 mmol) of ethyl-4-chlorobutyrate was added and refluxed overnight. The cooled solution was concentrated in a rotary evaporator. Approximately 100 mL of water was added to dissolve the salt, then extracted twice with ether (150 mL). The solution was concentrated down to a yellow oil and distilled to a clear liquid, 23.5 g (98%). 1H NMR (300 MHz, CDCl3) 1.25 (t, 3H) 2.10 (p, 2H), 2.45 (t, 2H), 3.22 (t, 2H), 4.14 (q, 2H).

To an argon purged 3-neck 250 ml round bottom flask was added 26 g (400 mmol) of zinc granules and 80 mL of THF. Adding 8 mL of 1,2-dibromoethane and allowing this to reflux on its own activated the zinc. Once this was cooled for a half-hour then 8 mL of chlorotrimethylsilane was added. Then the ethyl-4-iodobutyrate was added and heated to 50° C. overnight to complete the zinc insertion. Before the next step the stirring and the heating were stopped and allowed to settle.

To a 2-neck 500 mL round bottom flask was added 8.5 g (200 mmol) of lithium chloride. The flask was put under vacuum and flame dried several times to expel all water from the salt and the surface. After purging with argon 9.0 g (100 mmol) of copper cyanide was added to the flask under a strong stream of argon. This flask was then put under vacuum and purged with argon before the addition of the 80 mL of THF. This solution was cooled to −30° C. or less and the addition of the alkyl zinc iodide (no zinc pieces) was begun. The solution was warmed to 0° C. for ten minutes and then cooled to −78° C. or less and 4.4 mL (45 mmol) of 1,4-dichlorobutyne was added. This solution was allowed to warm slowly to room temperature overnight. The flask was opened to the atmosphere and poured into ammonium chloride to quench. Then the organic layer was extracted twice with 150 mL of ether and washed with brine. Dry the organic layer over magnesium sulfates filter and concentrate to get a crude oil. 1H NMR (300 MHz, CDCl3) 1.26 (t, 6H), 1.80 (p, 4H), 2.28 (t, 4H), 2.30 (t, 4H), 4.12 (q, 4H), 4.96 (d, 2H), 5.11 (d, 2H). High-resolution mass spectrometry: Theoretical Mass 282.18311, Measured Mass 282.18298, Deviation −0.45ppm.

The cyano compounds (e.g., Compound 8) are made in the same way only that synthesis starts with 4-chlorobutyronitrile.

EXAMPLE 4

The object of this example is to. provide polymerization procedures and resulting polymer properties obtained by reacting the functionalized diene monomers of the invention under various polymerization conditions. Representative functionalized polymers are set forth in Tables 1 and 2.

Bulk and Solution Free Radical Polymerization

The monomer was purified by distillation in the presence of $CaH_2$ or letting it pass through a basic aluminum column. The initiator (such as AIBN (2,2'-azobisisobutyronitrile), BPO (benzoyl peroxide), t-butyl peroxide, t-butyl hydroperoxide, t-butyl perbenzoate, potassium persulfate, etc.) was purified by recrystalization or by reprecipitation. Monomer and initiator were placed in an ampoule. For the solution free radical polymerization, the chosen solvent is added in a 1:2 volume/volume ratio (monomer:solvent). Solvents include hexane, benzene, anisole, bromobenzene and dioxane. The preferred solvents are bromobenzene and dioxane. Anisole causes a broadening in the molecular weight distribution. After three cycles of freeze-pump-thaw, the ampoule was sealed under vacuum and placed into an oil bath at the necessary temperature which is dependent on the halflife of the chosen initiator. At the end of the reaction, the ampoule was cooled to temperature below the monomer's boiling point and was broken. Polymer was removed out of the ampoule by dissolving in a suitable solvent (such as tetrahydrofuran, chloroform or methylene chloride) containing 50 mg of a stabilizer (such as 2,6-di-tert-butyl-4-methylphenol, 1,4-benzoquinone, etc.) which can prevent further reaction. The polymer was reprecipitated in a nonsolvent (such as methanol, water) or was obtained by evaporating the solvent. This type of polymerization is applicable to any of the monomers (e.g., Compounds 1–8) previously described.

"Living" Free Radical Polymerization

The monomer was purified by distillation in the presence of CaH2 or letting it pass through a basic aluminum column. The initiator (such as AIBN (2,2'-azobisisobutyronitrile), BPO (benzoyl peroxide), t-butyl peroxide, t-butyl hydroperoxide, t-butyl perbenzoate, potassium persulfate, tetramethyl-1-piperidinyloxy), solvent (such as hexane, toluene, benzene, anisole, etc.) if needed and other components (such as camphorsulfonic acid which may be used to reduce the reaction time) were placed in an ampoule. After three cycles of freeze-pump-thaw, the ampoule was sealed under vacuum and placed into an oil bath at the necessary temperature (such as 120° C.–130° C.). At the end of the reaction, the ampoule was cooled to a temperature below the monomer's boiling point and was broken. Polymer was removed out of the ampoule by dissolving in a suitable solvent (such as tetrahydroftiran, chloroform or methylene chloride) containing 50 mg of stabilizer (such as 2,6-di-tert-butyl-4-methylphenol, 1,4-benzoquinone, etc.), which can prevent further reaction. The polymer was reprecipitated in a nonsolvent (such as methanol, water) or was obtained by evaporating the solvent. This type of polymerization is applicable to any of the monomers (e.g., Compounds 1–8) previously described.

Emulsion Polymerization

The monomer (2 g Compound 3, the initiator (0.024 g potassium persulfate), the surfactant (0.4 g sodium dodecylsulfate) and 15.2 g water were added to a 100 mL round bottom flask. The reaction was stirred vigorously using a mechanical overhead stirrer for 4–24 hours at 80° C. The polymer was isolated by evaporating the solvent. AU of the monomers (e.g., Compounds 1–8) described herein can be polymerized using this emulsion polymerization scheme.

Anionic Polymerization

All anionic polymerizations were carried out under high vacuum conditions using temperatures in the range of −78 to 25° C. All solutions were degassed twice and then transferred via syringe under an argon atmosphere. Benzene (30 mL) was distilled into a 250 mL reaction flask and then sec-butyllithium (0.65 mmol) was added. After setting the correct temperature for the reaction, the monomer was added. The amount of monomer added will be dependent upon the desired MW (molecular weight=grams of monomer over moles of initiator). The polymerizations were terminated with degassed methanol (10 mL) after 2 hours, and then precipitated into excess methanol (500 mL). After filtration, the samples were washed with more methanol (200 mL), the samples were then placed into a vacuum oven overnight before analysis. The solvents used for the polymerizations included benzene, hexane and THF. The initiators used include alkyllithiums, oligo (-methylstyryl) potassium, cumyl potassium or lithium naphthalenide. This procedure can be utilized for all monomers (e.g., Compounds 1–8) described herein.

TABLE 1

| monomer | initiator | Other components | Solvent | T/° C. | t/h | Mp | Mw | Mn | PD | Tg/° C. | note |
| --- | --- | --- | --- | --- | --- | --- | --- | --- | --- | --- | --- |
| Compound 7 | 1% BPO | | | 60–70 | 72 | 13,916 | 12,886 | 7,685 | broad | | Bulk polymerization |
| Compound 7 | 1.5% AIBN | | | 60–70 | 120 | 15,844 | 15,406 | 20,673 | broad | | Bulk polymerization |
| Compound 7 | 1.5% t-butyl hydro peroxide | | | 120–130 | 24 | 27,101 | 41,064 | 20,243 | 2.03 | | Bulk polymerization |
| Compound 3b | 1.2 wt. % K2S2O8 | 20.0 wt. % CH3(CH2)11SO3Na | 720 wt. % H2O | 80 | 4 | | 41,600 | 31,400 | 1.47 | | Emulsion polymerization |
| Compound 3b | 1.5 wt. % AIBN | | Dioxane (1:1) | 60 | 66 | | 14,300 | 10,100 | 1.41 | | Solution Polymerization |
| Compound 3b | 1.5 wt. % AIBN | | | 60 | 60 | | 22,900 | 17,000 | 1.35 | | Solution Polymerization |

TABLE 2

| Example | Monomer | Polymerization Method | Initiator | Initiator Mole %[a] | Surfactant[b] | Solvent |
|---|---|---|---|---|---|---|
| 1 | 1 | Bulk | AIBN[c] | 1.5 | N/A[d] | N/A |
| 2 | 1 | Bulk | t-BHP[e] | 1.5 | N/A | N/A |
| 3 | 3a | Bulk | AIBN | 1.5 | N/A | N/A |
| 4 | 3a | Bulk | t-BHP | 1.5 | N/A | N/A |
| 5 | 3b | Solvent | AIBN | 2.2 | N/A | Hexane |
| 6 | 3b | Solvent | AIBN | 2.2 | N/A | Toluene |
| 7 | 3b | Solvent | AIBN | 2.2 | N/A | Benzene |
| 8 | 3b | Solvent | AIBN | 2.2 | N/A | Anisole |
| 9 | 3b | Solvent | AIBN | 2.2 | N/A | Bromobenzene |
| 10 | 3b | Solvent | AIBN | 2.2 | N/A | Dioxane |
| 11 | 3b | Bulk | AIBN | 2.2 | N/A | N/A |
| 12 | 3b | Emulsion | $K_2S_2O_8$[f] | 0.5 | $CH_3(CH_2)_{11}SO_3Na$[g] 5 mole % | Water |
| 13 | 3c | Bulk | AIBN | 1.5 | N/A | N/A |
| 14 | 3c | Bulk | AIBN | 1.5 | N/A | N/A |
| 15 | 3c | Bulk | t-BHP | 1.5 | N/A | N/A |
| 16 | 7 | Bulk | t-BHP | 1.5 | N/A | N/A |

| Example | T(°C.)[h] | t(h)[i] | $M_2(\times 10^{-3})$[j] | $M_n(\times 10^{-3})$[k] | PD[l] | $T_g$(°C.)[m] | Microstructure[q] cis 1,4 | trans 1,4 | 1,2 | 3,4 |
|---|---|---|---|---|---|---|---|---|---|---|
| 1 | 70 | 24 | 21.0 | 12.0 | 1.75 | | — | — | — | — |
| 2 | 120 | 24 | 13.3 | 8.0 | 1.62 | | — | — | — | — |
| 3 | 70 | 24 | 5.8 | 4.6 | 1.27 | -61.7 | — | — | — | — |
| 4 | 120 | 24 | —[n] | —[o] | —[p] | -20 | — | — | — | — |
| 5 | 70 | 24 | 8.7 | 6 | 1.46 | -51 | 65–69% | 20–23% | 1–5% | 4–8% |
| 6 | 70 | 24 | 7.7 | 4.9 | 1.58 | -51 | 65–69% | 20–23% | 1–5% | 4–8% |
| 7 | 70 | 24 | 9.9 | 7.2 | 1.37 | -50 | 65–69% | 20–23% | 1–5% | 4–8% |
| 8 | 70 | 24 | 9.4 | 4 | 2.36 | -51 | 65–69% | 20–23% | 1–5% | 4–8% |
| 9 | 70 | 24 | 13.4 | 9.8 | 1.37 | -50 | 65–69% | 20–23% | 1–5% | 4–8% |
| 10 | 70 | 24 | 14.2 | 10.1 | 1.41 | -50 | 65–69% | 20–23% | 1–5% | 4–8% |
| 11 | 70 | 24 | 32.4 | 24.0 | 1.35 | -49.5 | 65–69% | 20–23% | 1–5% | 4–8% |
| 12 | 80 | 4 | 46.2 | 31.4 | 1.47 | -48.4 | 69% | 23% | 4% | 4% |
| 13 | 70 | 24 | 20.5 | 12.6 | 1.63 | -61.0 | 60–65% | 25–30% | 2–7% | 2–7% |
| 14 | 70 | 48 | 29.9 | 14.6 | 2.05 | | 60–65% | 25–30% | 2–7% | 2–7% |
| 15 | 120 | 24 | 68 | 34 | 2.0 | | 60% | 29% | 5% | 6% |
| 16 | 120 | 24 | 40 | 20 | 2.0 | -10 | — | — | — | — |

(a) (moles initiator/moles monomer) × 100 (b) Surfactant used only in emulsion polymerization (c) 2,2'-Azobisisobutyronitrile (d) None used (e) tert-butylhydroperoxide (f) Potassium persulfate (g) Sodium dodecyl sulfate, surfactant for emulsion polymerization. (h) Reaction temperature in degrees Celsius (i) Reaction time in hours (j) Weight average molecular weight from GPC (k) Number average molecular weight fromGPC (l) Polydispersity from GPC (m) Glass transition temperature from DSC (n, o, p) Insoluble in THF (q) Determined from $^1$H NMR While the invention has been described with reference to specific embodiments, it will be apparent to those skilled in the art that many alternatives, modifications, and variations may be made. Accordingly, it is intended to embrace all such alternatives, modifications, and variations that may fall within the spirit and scope of the appended claims.

What is claimed as new and desired to be protected by Letters Patent of the United States is:

1. A method of preparing a functionalized diene polymer, comprising polymerizing a functionalized diene compound of the formula:

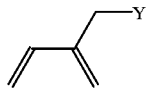

where Y is CN, OCOCH₃, NR₂, COOH or COOEt and R is selected from the group consisting of methyl, ethyl, and isopropy; a functionalized diene compound of the formula:

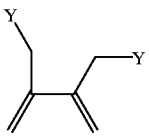

wherein Y is NR₂ and R is selected from the group consisting of methyl, ethyl, and isopropy; or a functionalized diene compound of the formula:

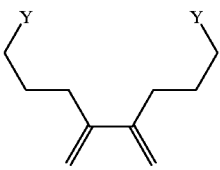

wherein Y is COOEt or CN; and wherein said functionalized diene compound is prepared by reacting 1,4-dibromo-2-methyl-2-butene with a base to form a monobromide, and reacting said monobromide with a nucleophile to form said functionalized diene compound.

2. The method of claim 1, wherein said compound is a compound of the formula:

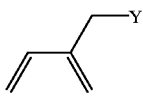

wherein Y is CN or N(n-propyl)$_2$.

3. The method of claim 1, wherein said compound is a compound of the formula:

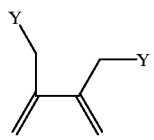

wherein Y is NR$_2$ and R is selected from the group consisting of methyl, ethyl, and isopropy.

4. The method of claim 1, wherein said compound is a compound of the formula:

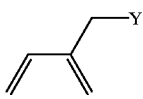

wherein Y is CN, OCOCH$_3$, NR$_2$, COOH or COOEt, and R is selected from the group consisting of methyl, ethyl and isopropy.

5. The method of claim 1 wherein said base is 1,3-dimethyl-3,4,5,6-tetrahydro-2(1H)-pyrimidinone.

6. The method of claim 5 further comprising the step of mixing said functionalized diene with NaOH or EtOH to form a functionalized diene having a COOH or COOEt functional group.

7. The method of claim 1 further comprising the step of purifying said functionalized diene by acid-base extraction.

8. The method of claim 3, further comprising the step of preparing said compound by reacting amino-2-bromopropene with copper iodide.

9. The method of claim 8 comprising the further step of contacting at least a portion of the resulting amino-2-bromopropene and copper iodide reaction mixture with ammonium chloride.

10. The method of claim 8 wherein said amino-2-bromopropene is 1-diethyl amino-2-bromopropene.

11. The method of claim 8 wherein said amino-2-bromopropene is dimethyl amino-2-bromopropene.

12. The method of claim 8 wherein said amino-2-bromopropene is diisopropyl amino-2-bromopropene.

13. The method of claim 8 further comprising the step of cooling said amino-2-bromopropene and said copper iodide to a temperature of below about −78° C.

14. The method of claim 13 further comprising the step of opening said reaction mixture to air.

15. The method of claim 4, further comprising the step of preparing said compound by reacting ethyl-4-iodobutyrate with 4-chlorobutyronitrile.

16. The method of claim 15 comprising the further step of quenching the reaction to form a quenched reaction product.

17. The method of claim 16 comprising the further step of extracting the organic layer from the quenched reaction product.

18. The method of claim 1 wherein said polymer is a copolymer.

19. The method of claim 18 wherein said copolymer comprises at least one monomer selected from the group consisting of diene monomers and vinyl monomers.

20. The method of claim 19 wherein said diene monomer is selected from the group consisting of butadiene, isoprene, piperylene, and hexadienes.

21. The method of claim 19 wherein said vinyl monomer is selected from the group consisting of styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid, and acrylic acid.

22. The method of claim 1, wherein said monobromide is 2-bromomethyl-1,3-butadiene.

23. The method of claim 1, wherein said nucleophile is selected from the group consisting of CN, OCOCH$_3$, methyl, ethyl, and propyl.

24. Polymerized functionalized diene monomers selected from the group consisting of 2-cyanomethyl-1,3-butadiene; 2-acetoxymethyl-buta-1,3-diene; dimethyl-(2-methylene-but-3-enyl)-amine; 2-dimethylamidiomethyl-1,3-butadiene; 2-di-n-propylaminomethyl-1,3-butadiene; 3-methylene-pent-4-enoic acid; 3-methylene-pent-4-enoic acid ethyl ester; bis-2,3-[N,N-diethylaminomethyl]-1,3-butadiene; ethyl-5,6-dimethylenedecanediote; and cyano-5,6-dimethylenedecanediote, said polymerized functionalized diene monomers being prepared according to the method of claim 1.

25. A composition of matter comprising a functionalized diene polymer prepared according to the method of claim 1.

26. A composition of matter according to claim 25, wherein said functionalized diene polymer is selected from the group consisting of poly(cyanoisoprene); poly(2-acetoxymethylbutadiene); poly(N,N-dimethylaminoisoprene); poly(N,N-diethylaminoisoprene); poly(N,N-di-n-propylamino-isoprene); poly(2-carboxymethylisoprene); poly(2-ethylethanoatebutadiene); poly[2,3-(N,N-dimethylaminoethyl)-butadiene]; poly[2,3-(N,N-diethylaminomethyl)-butadiene]; poly[2,3-(N,N-diisopropylaminomethyl)-butadiene]; poly[2,3-(ethylbutanoate)butadiene]; and poly[2,3-(cyanomethyl)butadiene].

* * * * *